(12) United States Patent
Bai

(10) Patent No.: US 10,523,586 B2
(45) Date of Patent: Dec. 31, 2019

(54) PORT SWITCH SERVICE SYSTEM

(71) Applicant: Yang Bai, Shanghai (CN)

(72) Inventor: Yang Bai, Shanghai (CN)

( * ) Notice: Subject to any disclaimer, the term of this patent is extended or adjusted under 35 U.S.C. 154(b) by 0 days.

(21) Appl. No.: 15/552,453

(22) PCT Filed: Aug. 8, 2016

(86) PCT No.: PCT/CN2016/093880
§ 371 (c)(1),
(2) Date: Aug. 21, 2017

(87) PCT Pub. No.: WO2016/169529
PCT Pub. Date: Oct. 27, 2016

(65) Prior Publication Data
US 2018/0048587 A1 Feb. 15, 2018

(30) Foreign Application Priority Data
May 16, 2016 (CN) .......................... 2016 1 0323880

(51) Int. Cl.
| | | |
|---|---|---|
| H04L 12/28 | (2006.01) | |
| H04L 12/911 | (2013.01) | |
| G06F 16/22 | (2019.01) | |
| H04L 12/24 | (2006.01) | |
| H04L 12/873 | (2013.01) | |
| H04L 12/729 | (2013.01) | |
| H04L 29/06 | (2006.01) | |

(52) U.S. Cl.
CPC ........ H04L 47/783 (2013.01); G06F 16/2246 (2019.01); H04L 41/5009 (2013.01);
(Continued)

(58) Field of Classification Search
CPC ............. G06F 16/2246; H04L 41/5009; H04L 41/5077; H04L 43/10; H04L 45/125;
(Continued)

(56) References Cited

U.S. PATENT DOCUMENTS 8,537,841 B2 * 9/2013 Takeyoshi ............... H04L 63/08
370/338
8,949,656 B1 * 2/2015 Ninan ................. G06F 11/2005
714/4.1
(Continued)

FOREIGN PATENT DOCUMENTS

| CN | 101043398 A | 9/2007 |
|---|---|---|
| CN | 101252603 A | 8/2008 |

(Continued)

OTHER PUBLICATIONS

Trencseni, M. et al., "PaxosLease: Diskless Paxos for Leases", Distributed, Parallel, and Cluster Computing (CS.DC), Sep. 19, 2012, 9 pages.

*Primary Examiner* — Phuc H Tran
(74) *Attorney, Agent, or Firm* — Muncy, Geissler, Olds & Lowe, P.C.

(57) ABSTRACT

Provided is a port switch service (Port Switch Service, PSS), including a server cluster and a client cluster, wherein a master node in the current cluster is elected from the server cluster through a quorum algorithm and is guaranteed to be unique within a specified period in a lease form; the client cluster contains various client nodes needing to use the PSS, and each client node can establish connection with the master node as needed; and each of the client node is identified in the server cluster through the unique node ID. The port switch service is a message routing service integrating distributed coordination functions such as fault detection, service electing, service discovery, and distributed lock. By sacrificing reliability under the extreme condition, the port switch service realizes very high performance, capacity and concurrency capability in the premise of ensuring strong consistency, high availability and scalability.

6 Claims, 3 Drawing Sheets

(52) U.S. Cl.
CPC .......... *H04L 41/5077* (2013.01); *H04L 47/52* (2013.01); *H04L 45/125* (2013.01); *H04L 67/42* (2013.01)

(58) Field of Classification Search
CPC ....... H04L 47/52; H04L 47/783; H04L 67/10; H04L 67/42
See application file for complete search history.

(56) References Cited

U.S. PATENT DOCUMENTS

| | | | | |
|---|---|---|---|---|
| 2006/0056393 | A1* | 3/2006 | Sarmiento | H04M 1/2535 370/352 |
| 2009/0271598 | A1* | 10/2009 | Bayus | G06F 8/65 713/1 |
| 2010/0205273 | A1* | 8/2010 | Shim | G06F 11/1425 709/210 |
| 2012/0011398 | A1 | 1/2012 | Eckhardt et al. | |
| 2012/0254210 | A1* | 10/2012 | Dhulipala | G06F 17/30985 707/758 |
| 2013/0246366 | A1* | 9/2013 | Preslan | G06F 11/1453 707/652 |
| 2016/0171072 | A1* | 6/2016 | Jagtiani | G06F 16/273 707/613 |
| 2016/0380833 | A1* | 12/2016 | Zhu | H04L 12/4633 709/223 |

FOREIGN PATENT DOCUMENTS

| | | |
|---|---|---|
| CN | 102595208 A | 7/2012 |
| CN | 103684941 A | 3/2014 |

\* cited by examiner

PSS Server Cluster

PSS Client Cluster

PSS Server Cluster

PSS Client Cluster

PSS Server Cascade Cluster

PORT SWITCH SERVICE SYSTEM

BACKGROUND OF THE INVENTION

1. Field of the Invention

The present invention relates to a distributed coordination system, in particular to a port switch service.

2. The Prior Arts

Traditional distributed coordination services are usually implemented using quorum-based consensus algorithms like Paxos and Raft. Their main purpose is to provide applications with a high-availability service for accessing distributed metadata KV. The distributed coordination services such as distributed lock, message dispatching, configuration sharing, role election and fault detection are also offered based on the consistent KV storage. Common implementations of distributed coordination services include Google Chubby (Paxos), Apache ZooKeeper (Fast Paxos), etcd (Raft), Consul (Raft+Gossip), and etc.

Poor performance and high network consumption are the major problems with consensus algorithms like Paxos and Raft. For each access to these services, either write or read, it requires three times of broadcasting within the cluster to confirm in voting manner that the current access is acknowledged by the quorum. This is because the master node needs to confirm it has the support from the majority while the operation is happening, and to confirm it remains to be the legal master node.

In real cases, the overall performance is still very low and has strong impact to network IO, though the read performance can be optimized by degradation the overall consistency of the system or adding a lease mechanism. If we look back at the major accidents happened in Google, Facebook or Twitter, many of them are caused by network partition or wrong configuration (human error). Those errors lead to algorithms like Paxos and Raft broadcasting messages in an uncontrollable way, thus driving the whole system crashed.

Furthermore, due to the high requirements of network IO (both throughput and latency), for Paxos and Raft algorithm, it is difficult (and expensive) to deploy a distributed cluster across multiple data centers with strong consistency (anti split brain) and high availability. As examples: Aug. 20, 2015 Google GCE service interrupted for 12 hours and permanently lost part of data; May 27, 2015 and Jul. 22, 2016 Alipay interrupted for several hours; As well as the Jul. 22, 2013 WeChat service interruption for several hours, and etc. These major accidents are due to product not implement the multiple active IDC architecture correctly, so a single IDC failure led to full service off-line.

SUMMARY OF THE INVENTION

The present invention aims to solve the problems by providing a port switch service (PSS) and also providing distributed coordination functions such as fault detection, service electing, service discovery, and distributed lock, as well as the capabilities of strong consistency, high availability and anti split brain with same level as the Paxos and Raft algorithms. Performance and paralleling processing capability which are tens of thousands times of the formers are provided because high consumption operations such as nearly all network broadcastings, and disk I/O are eliminated. Large-scale distributed cluster system across multiple IDC can be built in the premise without additional requirements for the aspects of network throughput, delay, etc.

In order to realize the purposes, the technical scheme of the present invention is that: A port switch service (Port Switch Service, PSS) includes a server cluster and a client cluster, wherein a master node in the current cluster is elected from the server cluster through a quorum algorithm and is guaranteed to be unique within a specified period in a lease form; the client cluster contains various client nodes needing to use the PSS, and each client node can establish connection with the master node as needed; and each of the client node is identified in the server cluster through the unique node ID.

Further, the server cluster employs a mode of one master node plus a plurality of slave nodes, or a mode of one master node plus a plurality of slave nodes plus a plurality of arbiter nodes.

Further, each client (a server within an application cluster) node maintains at least one TCP Keep-Alive connection with the port switch service.

Further, any number of ports can be registered for each connection. A port is described using a UTF-8 character string, and must be globally unique.

Further, PSS offers the following application programming interface (API) primitives: Waiting for Message (WaitMsg), Relet, Port Registration (RegPort), Port Un-registration (UnRegPort), Message Sending (SendMsg), Port Query (QueryPort), Node Query (QueryNode) and Clear.

Further, connection of the client cluster and the port switch service includes message receiving connection and message sending connection.

With adoption of the technology, compared with the prior art, the present invention has the following positive effects:

The present invention eliminates master consumptions, such as network broadcasting, disk I/O and etc., following each access request in the traditional distributed coordination algorithms such as Paxos, and Raft, and thus the whole performance of the system is remarkably improved (by thousands and even ten thousands times. Not only that, but the present invention supports a batch request mechanism since a vote does not need to be initiated for each request singly any more, and this greatly increases the network utilization ratio (by several tens of times), and further strengthens the system performance expression under a heavy load (during busy business).

The present invention integrates standard message routing function into distributed coordination services such as service electing (port registration), service discovery (send message and query port information), fault detection (relet timeout) and distribute locking (port registration and unregister notification). This high-performance message switch service has distributed coordination capabilities. Also, it can be purely used as a service electing and discovery service with fault detection.

The design of the present invention of eliminating unrelated functions such as a configuration management database (CMDB). Further strengths the capacity and the performance of the system (equivalent to a manner of only retaining K:Key and removing a part of V: Value in the traditional KV storage mechanism; or only retaining path information and removing values in the traditional tree data structure).

The present invention maintains a message buffering queue for each connection and saves all port definitions and messages to be forwarded in the master node's memory (Full in-memory); any data replication and state synchronization consumption are not needed among the master node and slave nodes; and information sending and receiving are both realized by using pure asynchronous I/O, and thus high-concurrency and high-throughput message forwarding performance can be provided.

The present invention has the scalability, and when single-node performance gets a bottleneck, service can scale out by cascading upper-level port switch service, similar to the three layers (access, aggregation, and core) switch architecture in IDC.

DETAILED DESCRIPTION OF THE PREFERRED EMBODIMENT

Embodiments of the present invention are further described below in conjunction with drawings.

In order to make the purpose, technical scheme and advantages of the present invention more clearly, the present invention will be described in detail in conjunction with functional diagrams and flow diagrams. The following schematic embodiments and descriptions thereof are provided to illustrate the present invention, and do not constitute any limitation to the present invention.

A port switch service (Port Switch Service, PSS) includes a server cluster and a client cluster, wherein a master node in the current cluster is elected from the server cluster through a quorum algorithm and is guaranteed to be unique within a specified period in a lease form; the client cluster contains various client nodes needing to use the PSS, and each client node can establish connection with the master node as needed; and each of the client node is identified in the server cluster through the unique node ID.

Figure 1:
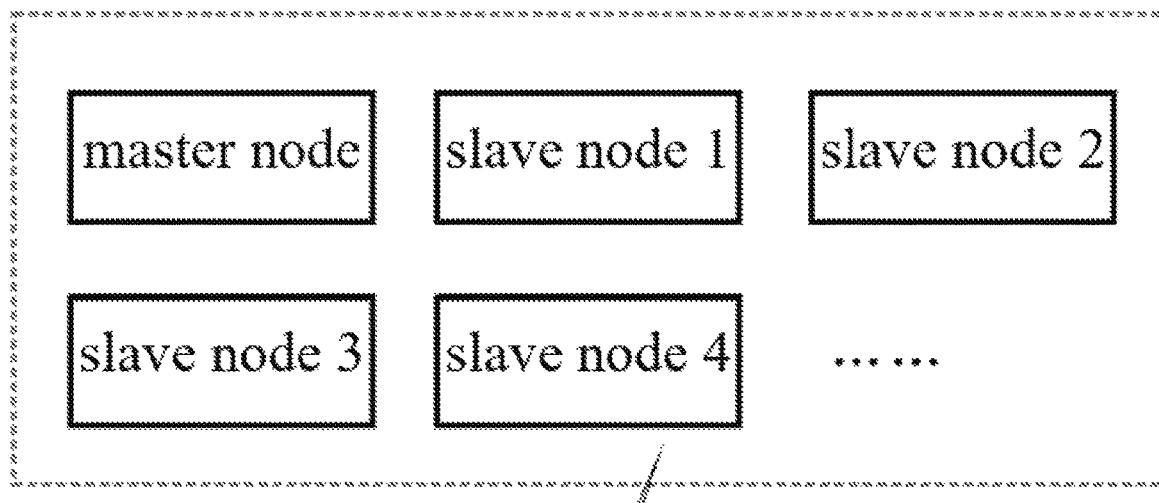
FIG. 1 is a structure schematic diagram with one master node plus a plurality of slave nodes of the port switch service of the present invention.
Figure 1:
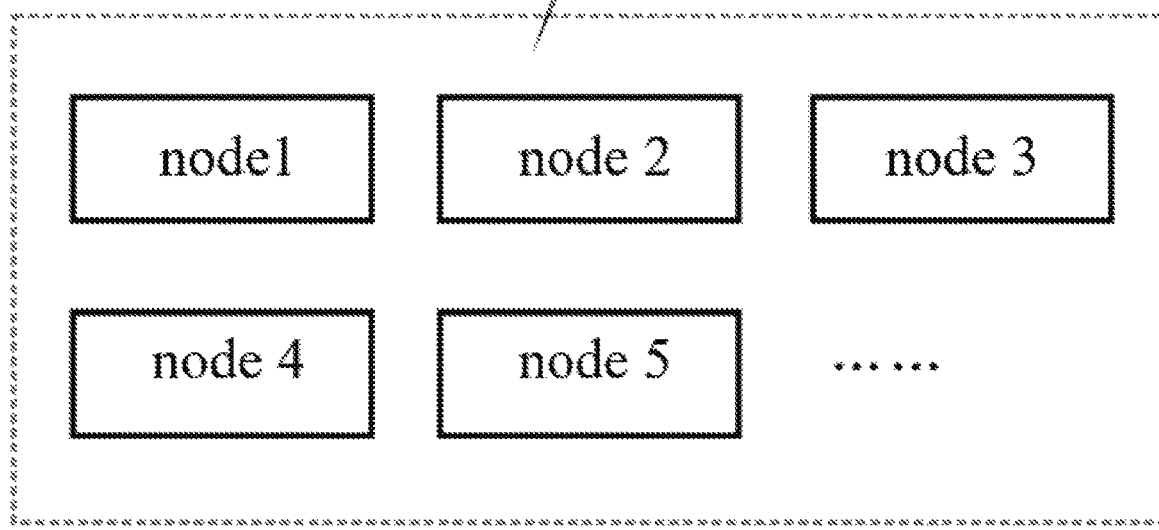
Figure 2:
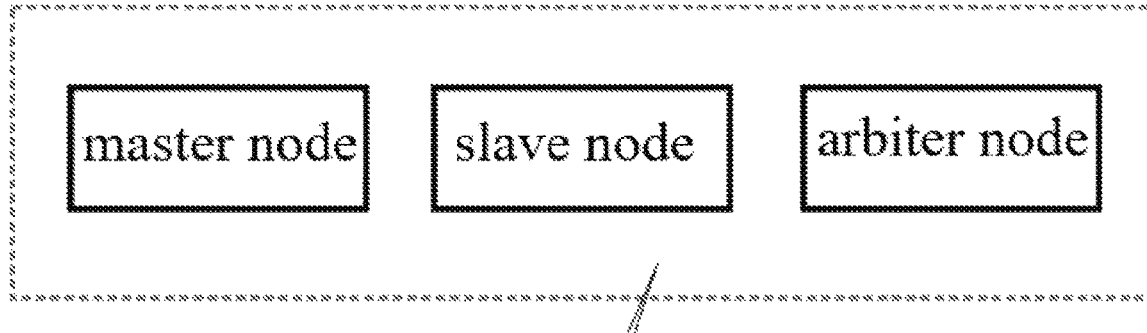
FIG. 2 is a structure schematic diagram with one master node plus a plurality of slave nodes plus a plurality of arbiter nodes of the port switch service of the present invention.
Figure 2:
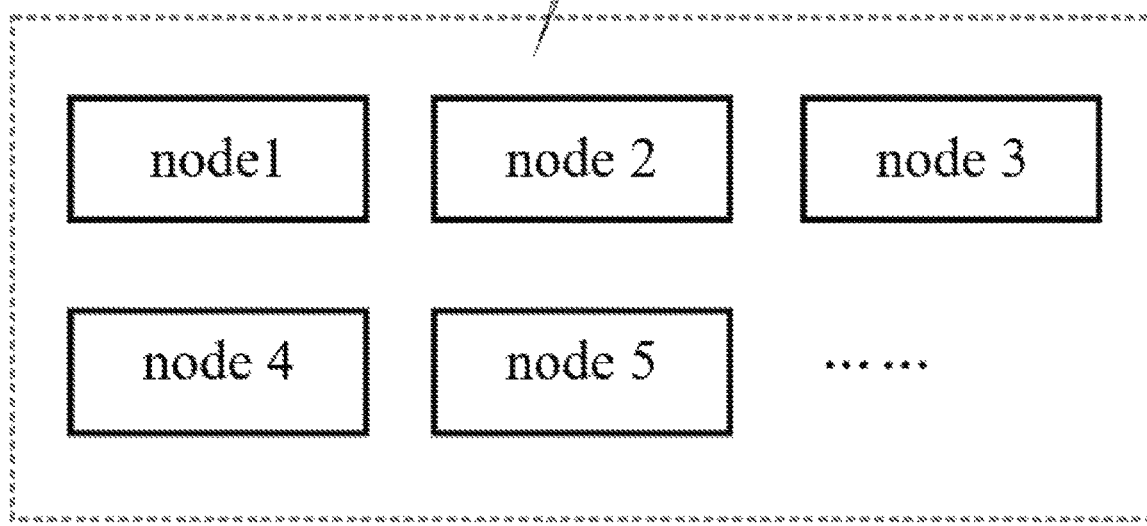

Referring to FIGS. 1 and 2, preferably, the server cluster employs a mode of one master node plus a plurality of slave nodes, or a mode of one master node plus a plurality of slave nodes plus a plurality of arbiter nodes.

Preferably, each client (a server within an application cluster) node maintains at least one TCP Keep-Alive connection with the port switch service.

Preferably, any number of ports can be registered for each connection. A port is described using a UTF-8 character string, and must be globally unique. Registering a port will fail if the port is already registered by another client node.

Preferably, PSS offers the following application programming interface (API) primitives: Waiting for Message (WaitMsg), Relet, Port Registration (RegPort), Port Un-registration (UnRegPort), Message Sending (SendMsg), Port Query (QueryPort), Node Query (QueryNode) and Clear.

PSS offers the following API primitives:

Waiting for Message (WaitMsg): Each node within the cluster should keep at least one TCP Keep-Alive connection with the PSS, and call this method to waiting for messages pushed by the server. This method upgrades the current connection from a message transmission connection to a message receiving connection.

Each node number corresponds to only one message receiving connection. If a node attempts to generate two message receiving connections at the same time, the earlier connection will be disconnected, and all ports bound with that node will be unregistered.

Relet: If PSS does not receive a relet request from a message receiving connection for a specified time period, it will treat the node as being offline, and will release all the ports associated with this node. A relet operation is used for periodically providing heartbeat signals to PSS.

Port Registration (RegPort): After a connection is established, the client should send request to PSS to register all the ports associated with the current node. A port registration request can contain any number of ports to be registered. PSS will return a list of ports (already occupied) that are failed to be registered. The caller can choose to subscribe port release notification for the ports failed to be registered.

Each time a message receiving connection is re-established through calling WaitMsg, the server need to register all the relevant ports again.

Port Un-registration (UnRegPort): To unregister the ports associated with the current node. A request can contain several ports for batch un-registration. The PSS service maintains a port un-registration notification list for each port under it. This list records the clients that are interested in the port unregistered event. When the port is unregistered (whether it is caused by an intentionally operation or due to a failure), PSS service will follow the list and push the port un-registration notification to corresponding clients.

Message Sending (SendMsg): To send a message (BLOB) to the specified port. The message format is transparent to PSS. If the specified port is an empty string, the message will be broadcasted to all nodes within PSS. If the specified port does not exist, the message will be discarded quietly. The client can package multiple message sending commands within a single network request for batch sending, The PSS server will package messages sent to the same node automatically for batch message push.

Port Query (QueryPort): To query node number and network address associated with the node currently owns the specified port. This operation is used for service discovery with fault detection. This method is not needed for message sending (SendMsg) because the operation is automatically executed while delivering a message. A request can contain several ports for batch query.

Node Query (QueryNode): To query information (e.g. network address) associated with the specified node. This operation is mainly used for node resolving with fault detection. A request can contain several nodes for batch query.

Clear: Executing clearing operation before disconnection of message receiving connection. Similar to the FIN signal in the four-way handshake of TCP protocol. Disconnected a message receiving connection without calling of this primitive successfully, will be judged to be in abnormal disconnection by the port switch service, at this time, all the ports owned by the client cannot be released immediately and can only be released when being delayed to node timeout duration of the client.

Thus, a port can be strictly guaranteed to have strong consistency of at most only one owner at any given time. Even if the client does not use the TCP protocol to connect PSS, or the client make the connection through some intermediate nodes such as a gateway, or a proxy.

Preferably, data of all the ports and messages is only stored in the memory of the master node of the PSS server cluster. The PSS master node neither writes port information in the disk nor synchronizes the data among other nodes in the PSS server cluster, such as slave nodes, and arbiter nodes (single-point full-in-memory mode).

Preferably, connection of the client cluster and port switch service includes message receiving connection and message sending connection.

Message receiving connection (1:1): It uses WaitMsg method for node registration and message pushing; keeps occupying all ports belong to current node using Relet, and use the Clear primitive to clean up before normal disconnection. Each node within the cluster should keep and only keep a single message receiving connection, which is a Keep-Alive connection. It is recommended to always keep the connection active and to complete Relet in a timely manner, because re-establishing a receiving connection will require service electing again (port registration).

Message sending connection (1:N): All connections that are not upgraded using WaitMsg API are deemed as sending connections. They use primitives like RegPort, UnRegPort, SendMsg and QueryPort for non-pushing requests, without the need for using Relet to keep heartbeat. It also does not need to use the Clear command to clean up. Each node within the cluster maintains a message sending connection pool, so that the worker threads can stay in communication with the port switch service.

Figure 3:
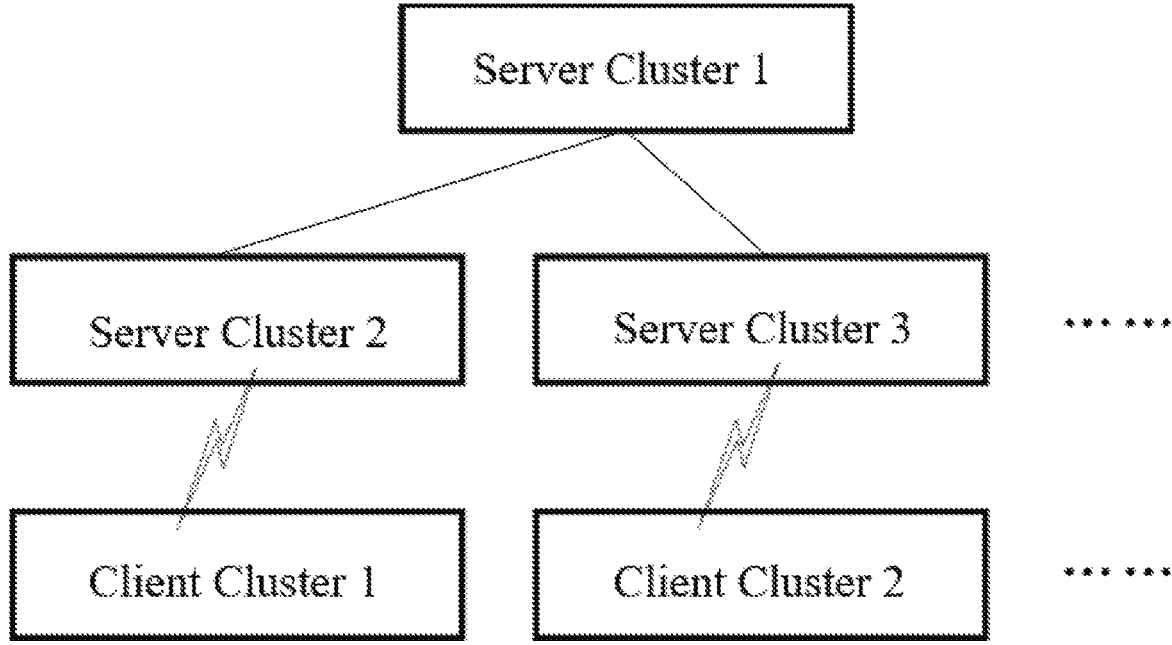
FIG. 3 is a structure schematic diagram of horizontally-scaled PSS server cluster and client cluster of a tree structure.

A horizontal scaling (scale out) mode of the port switch server cluster is shown in FIG. 3, and during cascade deployment, the leaf nodes in the tree structured PSS server clusters will serve the respective client clusters and supply distributed coordination service for them. These leaf clusters are in charge of processing all local requests and escalate all the requests exceeding the local strategy range to more advanced server clusters until the requests can be processed and returned back down with a result level by level (the result can be cached level by level for improving the efficiency).

The strategy range is limited by the name space, it is stipulated that one client node can only be registered on ports under a local name space and a superior name space of the client node, but cannot be registered on ports under a brother name space or a collateral name space. Message sending is not limited: one client node can send messages to any port and node in the system.

Since, in practice, most of requests sent by the PSS client nodes are all local requests (only local PSS clusters are involved), such cascading mode not only can efficiently realize horizontal scaling, but also can be used for deploying extra-long distance offsite clusters among different Regions. In this case, the cost of communications across regions is high, and the consumption of the communications across the regions can be effectively reduced by deploying a set of leaf clusters for each region respectively (all the leaf clusters are uniformly connected to superior clusters in different levels).

Figure 4:
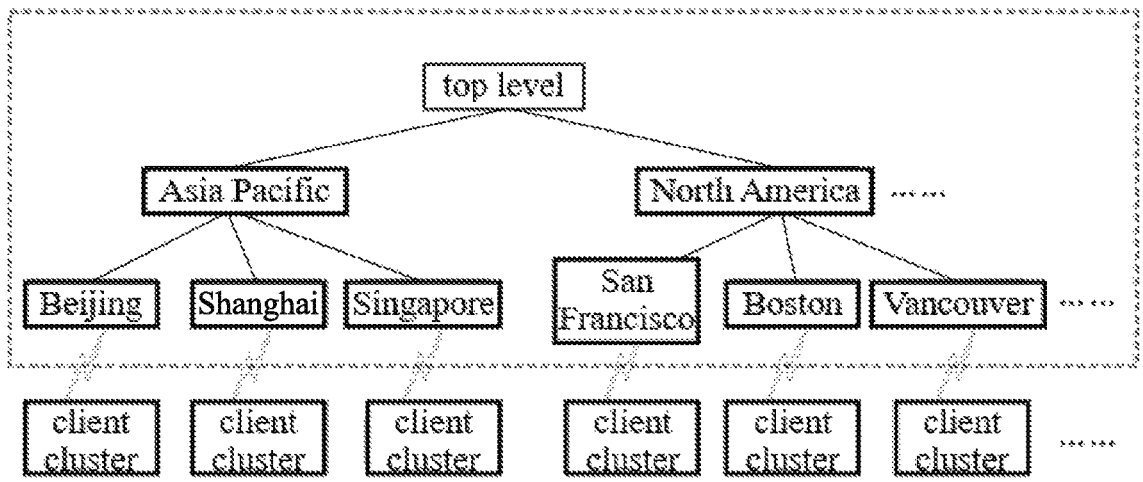
FIG. 4 is a using example of the present invention.

Referring to FIG. 4, the PSS server is formed by clusters in a three-level cascading structure, wherein the top-level cluster is in charge of port change (registration, unregistration, etc.) operations and message forwarding across large areas (Asia-Pacific area, North America area, etc.) in the global name space.

A second level in the cascading structure corresponds to various large areas such as Asia-Pacific area, and North America area, and a corresponding PSS server cluster is in charge of each large area, wherein each cluster can process port change in its own large area and the message forwarding requests among various regions in the large area. The clusters are connected to the top-level clusters upward and supply service for PSS in different regions in the large area downward.

A third level in the cascading structure corresponds to various regions in the large area respectively, such as Shanghai region, Beijing region, and San Francisco region. One leaf-level PSS server cluster is in charge of managing each region. Port change and message forwarding requests within the regions can be resolved by the corresponding leaf PSS server cluster without requirement for the upper-level clusters. Only the requests exceeding the local range need to be escalated to the upper-level cluster for processing. For example, message switch and port registration requests in Beijing can be processed by the leaf PSS server clusters in Beijing; a message send by one Beijing node to one Shanghai node needs to be transferred by the Asia-Pacific cluster; and a message send by one Beijing node to one San Francisco node needs to be transferred in a way of the Asia-Pacific area cluster, the top-level cluster, the North America area cluster, etc.

Correspondingly, the client nodes in Beijing can be registered on the ports of the name spaces belonging to Beijing, Asia-Pacific area and global area (top-level), but cannot be registered on the ports of the name spaces in the range of Shanghai, North America, Vancouver, etc. (Note: descriptions for FIG. 4 are all examples, division rules containing the cascading structure with any levels and any regions can be used as needed in practical conditions).

Seen from this, the present invention has the following characteristics:

Availability: High availability insurance by completing fault detection and master/slave switching within two seconds; quorum-based election algorithm, avoiding split brain due to network partition.

Consistency: A port can be owned by only one client node at any given time. It is impossible that multiple nodes can succeed in registering and occupying the same port simultaneously.

A node receiving connection is recovered from disconnection: After the message receiving connection was disconnected or re-connected, all the ports that were ever registered for this node will become invalid and need to be registered again. During the time frame from disconnection to re-connection, all messages sent to the ports that are bound with this node and have not been registered by any other nodes will be discarded.

Each time the PSS master node offline due to a failure, all registered ports will forcibly become invalid, and all active ports need to be registered again.

For example, if a distributed Web server cluster treat a user as the minimum schedule unit, and register a message port for each user who is logged in, after the master node of PSS is offline due to a failure, each node will know that all the ports it maintains have became invalid and it need to register all active (online) users again with the new PSS master.

This may seem to make the system performance fluctuations, but it does not a matter: this operation can be completed in a batch. Through the batch registration interface, it is permitted to use a single request to register or unregister as much as millions of ports simultaneously, improving request processing efficiency and network utilization. On a Xeon processer (Haswell 2.0 GHz) which was release in 2013, PSS is able to achieve a speed of 1 million ports per second and per core (per thread). Thanks to the concurrent hash table (each arena has its own full user mode reader/writer lock optimized by assembly) which was developed by us, we can implement linear extension by simply increasing the number of processor cores.

Specifically, under an environment with 4-core CPU and Gigabit network adapter, PSS is capable of registering 4 millions of ports per second. Under an environment with 48-core CPU and 10G network adapter, PSS is able to support registering nearly 40 millions of ports per second (the name length of each of the ports is 16 bytes), almost reaching the limit for both throughput and payload ratio. There is almost no impact to system perforce, because the above scenarios rarely happen and re-registration can be done progressively as objects being loaded.

To illustrate this, we consider the extreme condition when one billion users are online simultaneously. Though applications register a dedicated port (for determining user owner and for message distribution) for each of the users respectively, it is impossible that all these one billion users will press the refresh button simultaneously during the first second after recovering from fault. Conversely, these online users will usually return to the server after minutes, hours or longer, which is determined by the intrinsic characteristics of Web applications (total number of online users=the number of concurrent requests per second×average user think time). Even we suppose all these users are returned within one minute (the average think time is one minute) which is a relatively tough situation, PSS only need to process 16 million registration requests per second, which means a 1U PC Server with 16-core Haswell and 10G network adapter is enough to satisfy the requirements.

As a real example, the official statistics show there were 180 million active users (DAU) in Taobao.com on November 11 ("double 11"), 2015, and the maximum number of concurrent online users is 45 million. We can make the conclusion that currently the peak number of concurrent users for huge sites is far less than the above mentioned extreme condition. PSS is able to support with ease even we increase this number tens of times.

The following table gives characteristic comparisons between PSS and some distributed coordination products that utilize traditional consensus algorithms like Paxos and Raft:

| Item | PSS | ZooKeeper, Consul, etcd . . . |
|---|---|---|
| Availability | High availability; supports multiple active IDC. | High availability; supports multiple active IDC. |
| Consistency | Strong consistency; the master node is elected by the quorum. | Strong consistency; multi-replica. |
| Concurrency | Tens of millions of concurrent connections; hundreds of thousands of concurrent nodes. | Up to 5,000 nodes. |
| Capacity | Each 10 GB memory can hold about 100 million message ports; each 1 TB memory can hold about ten billion message ports; two-level concurrent Hash table structure allows capacity to be linearly extended to PB level. | Usually supports up to tens of thousands of key-value pairs; this number is even smaller when change notification is enabled. |
| Delay | The delay per request within the same IDC is at sub-millisecond level (0.5 ms in Aliyun.com); the delay per request for different IDCs within the same region is at millisecond level (2 ms in Aliyun.com). | Because each request requires three times of network broadcasting and multiple times of disk I/O operations, the delay per operation within the same IDC is over 10 milliseconds; the delay per request for different IDCs is more longer (see the following paragraphs). |
| Performance | Each 1Gbps bandwidth can support nearly 4 million times of port registration and unregistration operations per second. On an entry-level Haswell processor (2013), each core can support 1 million times of the above mentioned operations per second. The performance can be linearly extended by increasing bandwidth and processor core. | The characteristics of the algorithm itself make it impossible to support batch operations; less than 100 requests per second. (Because each atomic operation requires three times of network broadcasting and multiple times of disk I/O operations, it is meaningless to add the batch operations supporting.) |
| Network utilization | High network utilization: both the server and client have batch packing capabilities for port registration, port unregistration, port query, node query and message sending; network payload ratio can be close to 100%. | Low network utilization: each request use a separate package (TCP Segment, IP Packet, Network Frame), Network payload ratio is typically less than 5%. |
| Scalability | Yes: can achieve horizontal scaling in cascading style. | No: more nodes the cluster contains (the range for broadcasting and disk I/O operations becomes wider), the worse the performance is. |
| Partition tolerance | The system goes offline when there is no quorum partition, but broadcast storm will not occur. | The system goes offline when there is no quorum partition. It is possible to produce a broadcast storm aggravated the network failure. |

| Item | PSS | ZooKeeper, Consul, etcd . . . |
|---|---|---|
| Message dispatching | Yes and with high performance: both the server and client support automatic message batching. | None. |
| Configuration Management | No: PSS believes the configuration data should be managed by dedicate products like Redis, MySQL, MongoDB and etc. Of course the distribute coordination tasks of these CMDB products (e.g. master election) can still be done by the PSS. | Yes: Can be used as a simple CMDB. This confusion on the functions and responsibilities making capacity and performance worse. |
| Fault recovery | Need to re-generate a state machine, which can be completed at tens of millions of or hundreds of millions of ports per second; practically, this has no impact on performance. | There is no need to re-generate a state machine. |

Among the above comparisons, delay and performance mainly refers to write operations. This is because almost all of the meaningful operations associated with a typical distributed coordination tasks are write operations:

| Operations | From service coordination perspective | From distributed lock perspective |
|---|---|---|
| Port registration | Success: service election succeeded; becomes the owner of the service. Failed: successfully discover the current owner of the service. | Success: lock acquired successfully. Failed: failed to acquire the lock, returning the current lock owner. |
| Port unregistration | Releases service ownership. | Releases lock. |
| Unregistration notification | The service has offline; can update local query cache or participate in service election. | Lock is released; can attempt to acquire the lock again. |

As shown in the above table, the port registration in PSS corresponds to "write/create KV pair" in traditional distributed coordination products. The port unregistration corresponds to "delete KV pair", and the unregistration notification corresponds to "change notification".

To achieve maximum performance, we will not use read-only operations like query in production environments. Instead, we hide query operations in write requests like port registration. If the request is successful, the current node will become the owner. If registration failed, the current owner of the requested service will be returned. This has also completed the read operations like owner query (service discovery/name resolution).

Even a write operation (e.g., port registration) failed, it is still accompanied by a successful write operation. The reason is, there is a need to add the current node that initiated the request into the change notification list of specified item, in order to push notification messages to all interested nodes when a change such as port unregistration happens. So the write performance differences greatly affect the performance of an actual application.

From the high-performance cluster (HPC) perspective, as mentioned above, the biggest difference between PSS and the traditional distributed coordination products (described above) is mainly reflected in the following two aspects:

1. High performance: PSS eliminates the overhead of network broadcasting, disk IO, add the batch support operations and other optimizations. As a result, the overall performance of the distributed coordination service has been increased by tens of thousands of times.

2. High capacity: about 100 million message ports per 10 GB memory, due to the rational use of the data structure such as concurrent hash table, the capacity and processing performance can be linearly scaled with the memory capacity, the number of processor cores, the network card speed and other hardware upgrades.

Due to the performance and capacity limitations of traditional distributed coordination services, in a classical distributed cluster, the distributed coordination and scheduling unit is typically at the service or node level. At the same time, the nodes in the cluster are required to operate in stateless mode as far as possible. The design of service node stateless has low requirement on distributed coordination service, but also brings the problem of low overall performance and so on.

PSS, on the other hand, can easily achieve the processing performance of tens of millions of requests per second, and tens of billions to hundreds of billions of message ports capacity. This provides a good foundation for the fine coordination of distributed clusters. Compared with the traditional stateless cluster, PSS-based fine collaborative clusters can bring a huge overall performance improvement.

User and session management is the most common feature in almost all network applications. We first take it as an example: In a stateless cluster, the online user does not have its owner server. Each time a user request arrives, it is routed randomly by the reverse proxy service to any node in the backend cluster. Although LVS, Nginx, HAProxy, TS and other mainstream reverse proxy server support node stickiness options based on Cookie or IP, but because the nodes in the cluster are stateless, so the mechanism simply increases the probability that requests from the same client will be routed to a certain backend server node and still cannot provide a guarantee of ownership. Therefore, it will not be possible to achieve further optimizations.

While benefiting from PSS's outstanding performance and capacity guarantee, clusters based on PSS can be coordinated and scheduled at the user level (i.e.: registering one port for each active user) to provide better overall performance. The implementation steps are:

1. As with the traditional approach, when a user request arrives at the reverse proxy service, the reverse proxy determines which back-end server node the current request should be forwarded to by the HTTP cookie, IP address, or related fields in the custom protocol. If there is no sticky tag in the request, the lowest-load node in the current back-end cluster is selected to process the request.
2. After receiving the user request, the server node checks to see if it is the owner of the requesting user by looking in the local memory table.
    a) If the current node is already the owner of the user, the node continues processing the user request.
    b) If the current node is not the owner of the user, it initiates a RegPort request to PSS, attempting to become the owner of the user. This request should be initiated in batch mode to further improve network utilization and processing efficiency.
        i. If the RegPort request succeeds, the current node has successfully acquired the user's ownership. The user information can then be loaded from the backend database into the local cache of the current node (which should be optimized using bulk load) and continue processing the user request.
        ii. If the RegPort request fails, the specified user's ownership currently belongs to another node. In this case, the sticky field that the reverse proxy can recognize, such as a cookie, should be reset and point it to the correct owner node. Then notifies the reverse proxy service or the client to retry.

Compared with traditional architectures, taking into account the stateless services also need to use MySQL, Memcached or Redis and other technologies to implement the user and session management mechanism, so the above implementation does not add much complexity, but the performance improvement is very large, as follows:

| Item | PSS HPC | Traditional Stateless Cluster |
| --- | --- | --- |
| 1 Op. | Eliminating the deployment and maintenance costs of the user and session management cluster. | Need to implement and maintain the user management cluster separately, and provides dedicated high-availability protection for the user and session management service. Increases the number of fault points, the overall system complexity and the maintenance costs. |
| 2 Net. | Nearly all user matching and session verification tasks for a client request can be done directly in the memory of its owner node. Memory access is a nanosecond operation, compared to millisecond-level network query delay, performance increase of more than 100,000 times. While effectively reducing the network load in the server cluster. | It is necessary to send a query request to the user and session management service over the network each time a user identity and session validity is required and wait for it to return a result. Network load and the latency is high. Because in a typical network application, most user requests need to first complete the user identification and session authentication to continue processing, so it is a great impact on overall performance. |
| 3 Cch. | Because each active user has a definite owner server at any given time, and the user is always inclined to repeat access to the same or similar data over a certain period of time (such as their own properties, the product information they have just submitted or viewed, and so on). As a result, the server's local data caches tend to have high locality and high hit rates.<br>Compared with distributed caching, the advantages of local cache is very obvious:<br>1. Eliminates the network latency required by query requests and reduces network load (See "Item 2" in this table for details).<br>2. Get the expanded data structures directly from memory, without a lot of data serialization and deserialization work.<br>The server's local cache hit rate can be further improved if the appropriate rules for user owner selection can be followed, | No dedicated owner server, user requests can be randomly dispatched to any node in the server cluster; Local cache hit rate is low; Repeatedly caching more content in different nodes; Need to rely on the distributed cache at a higher cost. The read pressure of the backend database server is high. Additional optimizations are required, such as horizontal partitioning, vertical partitioning, and read/write separation. |

| Item | PSS HPC | Traditional Stateless Cluster |
|---|---|---|
| | for example:<br>a) Group users by tenant (company, department, site);<br>b) Group users by region (geographical location, map area in the game);<br>c) Group users by interest characteristics (game team, product preference).<br>And so on, and then try to assign users belonging to the same group to the same server node (or to the same set of nodes). Obviously, choice an appropriate user grouping strategy can greatly enhance the server node's local cache hit rate.<br>This allows most of the data associated with a user or a group of users to be cached locally. This not only improves the overall performance of the cluster, but also eliminates the dependency on the distributed cache. The read pressure of the backend database is also greatly reduced. | |
| 4<br>Upd. | Due to the deterministic ownership solution, any user can be ensured to be globally serviced by a particular owner node within a given time period in the cluster. Coupled with the fact that the probability of a sudden failure of a modern PC server is also very low.<br>Thus, the frequently changing user properties with lower importance or timeliness can be cached in memory. The owner node can update these changes to the database in batches until they are accumulated for a period of time.<br>This can greatly reduce the write pressure of the backend database.<br>For example, the shop system may collect and record user preference information in real time as the user browses (e.g., views each product item). The workload is high if the system needs to immediately update the database at each time a user views a new product. Also considering that due to hardware failure, some users who occasionally lose their last few hours of product browsing preference data are perfectly acceptable. Thus, the changed data can be temporarily stored in the local cache of the owner node, and the database is updated in batches every few hours.<br>Another example: In the MMORPG game, the user's current location, status, experience and other data values are changing at any time. The owner server can also accumulate these data changes in the local cache and update them to the database in batches at appropriate intervals (e.g.: every 5 minutes).<br>This not only significantly reduces the number of requests executed by the backend database, but also eliminates a significant amount of disk flushing by encapsulating multiple user data update requests into a single batch transaction, resulting in further efficiency improvements.<br>In addition, updating user properties through a dedicated owner node also avoids contention issues when multiple nodes are simultaneously updating the same object in a stateless cluster. It further improves database performance. | Cumulative write optimization and batch write optimization cannot be implemented because each request from the user may be forwarded to a different server node for processing. The write pressure of the backend database is very high.<br>A plurality of nodes may compete to update the same record simultaneously, further increasing the burden on the database.<br>Additional optimizations are required, such as horizontal partitioning and vertical partitioning, However, these optimizations will also result in side effects such as "need to implement distributed transaction support at the application layer." |
| 5<br>Push | Since all sessions initiated by the same user are managed centrally in the same owner node, it is very convenient to push an instant notification message (Comet) to the user.<br>If the object sending the message is on the | Because different sessions of the same user are randomly assigned to different nodes, there is a need to develop, deploy, and maintain a specialized message push |

| Item | PSS HPC | Traditional Stateless Cluster |
|---|---|---|
| | same node as the recipient, the message can be pushed directly to all active sessions belong to the recipient. Otherwise, the message may simply be delivered to the owner node of the recipient. Message delivery can be implemented using PSS (send messages to the corresponding port of the recipient directly, should enable the batch message sending mechanism to optimize). Of course, it can also be done through a dedicated message middleware (e.g.: Kafka, RocketMQ, RabbitMQ, ZeroMQ, etc.). If the user's ownership is grouped as described in item 3 of this table, the probability of completing the message push in the same node can be greatly improved. This can significantly reduce the communication between servers. Therefore, we encourage customizing the user grouping strategy based on the actual situation for the business properly. A reasonable grouping strategy can achieve the desired effect, that is, most of the message push occurs directly in the current server node. For example, for a game application, group players by map object and place players within the same map instance to the same owner node - Most of the message push in the traditional MMORPG occurs between players within the same map instance (AOI). Another example: For CRM, HCM, ERP and other SaaS applications, users can be grouped according to the company, place users belong to the same enterprise to the same owner node - It is clear that for such enterprise applications, nearly 100% of the communications are from within the enterprise members. The result is a near 100% local message push rate: the message delivery between servers can almost be eliminated. This significantly reduces the internal network load of the server cluster. | cluster. It also needs to be specifically designed to ensure the high performance and high availability of the cluster. This not only increases the development and maintenance costs, but also increases the internal network load of the server cluster, because each message needs to be forwarded to the push service before it can be sent to the client. The processing latency of the user request is also increased. |
| 6 Bal. | Clusters can be scheduled using a combination of active and passive load balancing. Passive balancing: Each node in the cluster periodically unloads users and sessions that are no longer active, and notifies the PSS service to bulk release the corresponding ports for those users. This algorithm implements a macro load balancing (in the long term, clusters are balanced). Active balancing: The cluster selects the load balancing coordinator node through the PSS service. This node continuously monitors the load of each node in the cluster and sends instructions for load scheduling (e.g.: request node A to transfer 5,000 users owned by it to Node B). Unlike the passive balancing at the macro level, the active balancing mechanism can be done in a shorter time slice with quicker response speed. Active balancing is usually effective when some of the nodes in the cluster have just recovered from the failure (and therefore are in no-load state), it reacts more rapidly | If the node stickiness option is enabled in the reverse proxy, its load balancing is comparable to the PSS cluster's passive balancing algorithm. If the node stickiness option in the reverse proxy is not enabled, its balance is less than the PSS active balance cluster when recovering from a failure. At the same time, In order to ensure that the local cache hit rate and other performance indicators are not too bad, the administrator usually does not disable the node sticky function. In addition, SOA architecture tends to imbalance between multiple services, resulting in some services overload, and some light-load, μSOA cluster without such shortcomings. |

| Item | PSS HPC | Traditional Stateless Cluster |
|---|---|---|
| | than the passive balancing. For Example: In a cluster that spans multiple active IDCs, an IDC resumes on-line when a cable fault has just been restored. | |

It is worth mentioning that such a precise collaborative algorithm does not cause any loss in availability of the cluster. Consider the case where a node in a cluster is down due to a failure: At this point, the PSS service will detect that the node is offline and automatically release all users belonging to that node. When one of its users initiates a new request to the cluster, the request will be routed to the lightest node in the current cluster (See step 2-b-i in the foregoing). This process is transparent to the user and does not require additional processing logic in the client.

The above discussion shows the advantages of the PSS HPC cluster fine coordination capability, taking the user and session management functions that are involved in almost all network applications as an example. But in most real-world situations, the application does not just include user management functions. In addition, applications often include other objects that can be manipulated by their users. For example, in Youku.com, tudou.com, youtube.com and other video sites, in addition to the user, at least some "video objects" can be played by their users.

Here we take the "video object" as an example, to explore how the use the fine scheduling capabilities of PSS to significantly enhance cluster performance.

In this hypothetical video-on-demand application, similar to the user management function described above, we first select an owner node for each active video object through the PSS service. Secondly, we will divide the properties of a video object into following two categories:

1. Common Properties: Contains properties that are less updated and smaller in size. Such as video title, video introduction, video tag, video author UID, video publication time, ID of the video stream data stored in the object storage service (S3/OSS), and the like. These properties are all consistent with the law of "read more write less", or even more, most of these fields cannot be modified after the video is published.

For such small-size, less-changed fields, they can be distributed in the local cache of each server node in the current cluster. Local memory caches have advantages such as high performance, low latency, and no need for serialization, plus the smaller size of the objects in cache. Combined with strategies to further enhance the cache locality, such as user ownership grouping, the overall performance can be improved effectively through a reasonable memory overhead (see below).

2. Dynamic Properties: Contains all properties that need to be changed frequently, or larger in size. Such as: video playback times, "like" and "dislike" times, scores, number of favours, number of comments, and contents of the discussion forum belong to the video and so on.

We stipulate that such fields can only be accessed by the owner of the video object. Other nodes need to send a request to the corresponding owner to access these dynamic attributes.

This means that we use the election mechanism provided by PSS to hand over properties that require frequent changes (updating the database and performing cache invalidation) or requiring more memory (high cache cost) to the appropriate owner node for management and maintenance. This result in a highly efficient distributed computing and distributed caching mechanism, greatly improving the overall performance of the application (see below).

In addition, we also stipulate that any write operation to the video object (whether for common or dynamic properties) must be done by its owner. A non-owner node can only read and cache the common properties of a video object; it cannot read dynamic properties and cannot perform any update operations.

Therefore, we can simply infer that the general logic of accessing a video object is as follows:

1. When a common property read request arrives at the server node, the local cache is checked. If the cache hit, then return the results directly. Otherwise, the common part of the video object is read from the backend database and added to the local cache of current node.

2. When an update request or dynamic property read request arrives, it checks whether the current node is the owner of the corresponding video object through the local memory table.

a) If the current node is already the owner of the video, the current node continues to process this user request: For read operations, the result is returned directly from the local cache of the current node; depending on the situation, write operations are either accumulated in the local cache or passed directly to the backend database (the local cache is also updated simultaneously).

b) If the current node is not the owner of the video but finds an entry matching the video in the local name resolution cache table, it forwards the current request to the corresponding owner node.

c) If the current node is not the owner of the video and does not find the corresponding entry in the local name resolution cache table, it initiates a RegPort request to PSS and tries to become the owner of the video. This request should be initiated in batch mode to further improve network utilization and processing efficiency.

i. If the RegPort request succeeds, then the current node has successfully acquired the ownership of the video. At this point, the video information can be loaded from the backend database into the local cache of the current node (which should be optimized using bulk loading) and continue processing the request.

ii. If the RegPort request fails, the specified video object is already owned by another node. In this case, the video and its corresponding owner ID are added to the local name resolution cache table, and the request is forwarded to the corresponding owner node for processing.

Note: Because PSS can push notifications to all nodes that are interested in this event each time the port is unregistered (whether due to explicit ownership release, or due to node failure offline). So the name resolution cache table does not require a TTL timeout mechanism similar to the DNS cache. It only needs to delete the corresponding entry if the port deregistration notice is received or the LRU cache is full. This not only improves the timeliness and accuracy of entries in the lookup table, but also effectively reduces the number of RegPort requests that need to be sent, improving the overall performance of the application.

Compared with the classic stateless SOA cluster, the benefits of the above design are as follows:

| Item | PSS HPC | Traditional Stateless Cluster |
|---|---|---|
| 1 Op. | The distributed cache structure is based on ownership, it eliminates the deployment and maintenance costs of distributed cache clusters such as Memcached and Redis. | Distributed cache clusters need to be implemented and maintained separately, increase overall system complexity. |
| 2 Cch. | A common property read operation will hit the local cache. If the owner node selection strategy that "Group users according to their preference characteristics" is used, then the cache locality will be greatly enhanced. Furthermore, the local cache hit rate will increase and the cache repetition rate in the different nodes of the cluster will decrease. As mentioned earlier, compared to distributed cache, the local cache can eliminate network latency, reduce network load, avoid frequent serialization and deserialization of data structures, and so on. In addition, dynamic properties are implemented using distributed cache based on ownership, which avoids the problems of frequent invalidation and data inconsistency of traditional distributed caches. At the same time, because the dynamic properties are only cached on the owner node, the overall memory utilization of the system is also significantly improved. | No dedicated owner server, user requests can be randomly dispatched to any node in the server cluster; Local cache hit rate is low; Repeatedly caching more content in different nodes; Need to rely on the distributed cache at a higher cost. The read pressure of the backend database server is high. Additional optimizations are required, such as horizontal partitioning, vertical partitioning, and read/write separation. Furthermore, even the CAS atomic operation based on the Revision field and other similar improvements can be added to the Memcached, Redis and other products. These independent distributed cache clusters still do not provide strong consistency guarantees (i.e.: The data in the cache may not be consistent with the records in the backend database). |
| 3 Upd. | Due to the deterministic ownership solution, It is ensured that all write and dynamic property read operations of video objects are globally serviced by a particular owner node within a given time period in the cluster. Coupled with the fact that the probability of a sudden failure of a modern PC server is also very low. Thus, the frequently changing dynamic properties with lower importance or timeliness can be cached in memory. The owner node can update these changes to the database in batches until they are accumulated for a period of time. This can greatly reduce the write pressure of the backend database. For example: the video playback times, "like" and "dislike" times, scores, number of favours, references and other properties will be changed intensively with every user clicks. If the system needs to update the database as soon as each associated click event is triggered, the workload is high. Also considering that due to hardware failure, the loss of a few minutes of the above statistics is completely acceptable. Thus, the changed data can be temporarily stored in the local cache of the owner node, and the database is updated in batches every few minutes. | Cumulative write optimization and batch write optimization cannot be implemented because each request may be forwarded to a different server node for processing. The write pressure of the backend database is very high. A plurality of nodes may compete to update the same record simultaneously, further increasing the burden on the database. Additional optimizations are required, such as horizontal partitioning and vertical partitioning, However, these optimizations will also result in side effects such as "need to implement distributed transaction support at the application layer." |

| Item | PSS HPC | Traditional Stateless Cluster |
|---|---|---|
| | This not only significantly reduces the number of requests executed by the backend database, but also eliminates a significant amount of disk flushing by encapsulating multiple video data update requests into a single batch transaction, resulting in further efficiency improvements.<br>In addition, updating video properties through a dedicated owner node also avoids contention issues when multiple nodes are simultaneously updating the same object in a stateless cluster. It further improves database performance. | |
| 4 Bal. | Clusters can be scheduled using a combination of active and passive load balancing.<br>Passive balancing: Each node in the cluster periodically unloads videos that are no longer active, and notifies the PSS service to bulk release the corresponding ports for those videos. This algorithm implements a macro load balancing (in the long term, clusters are balanced).<br>Active balancing: The cluster selects the load balancing coordinator node through the PSS service. This node continuously monitors the load of each node in the cluster and sends instructions for load scheduling (e.g.: request node A to transfer 10,000 videos owned by it to Node B). Unlike the passive balancing at the macro level, the active balancing mechanism can be done in a shorter time slice with quicker response speed.<br>Active balancing is usually effective when some of the nodes in the cluster have just recovered from the failure (and therefore are in no-load state), it reacts more rapidly than the passive balancing. For Example: In a cluster that spans multiple active IDCs, an IDC resumes on-line when a cable fault has just been restored. | When recovering from a fault, the balance is less than the PSS active balanced cluster.<br>However, there is no significant difference under normal circumstances.<br>In addition, SOA architecture tends to imbalance between multiple services, resulting in some services overload, and some light-load, µSOA cluster without such shortcomings. |

Similar to the previously mentioned user management case, the precise collaboration algorithm described above does not result in any loss of service availability for the cluster. Consider the case where a node in a cluster is down due to a failure: At this point, the PSS service will detect that the node is offline and automatically release all videos belonging to that node. When a user accesses these video objects next time, the server node that received the request takes ownership of the video object from PSS and completes the request. At this point, the new node will (replace the offline fault node) becomes the owner of this video object (See step 2-c-i in the foregoing). This process is transparent to the user and does not require additional processing logic in the client.

The above analysis of "User Management" and "Video Services" is just an appetizer. In practical applications, the fine resource coordination capability provided by PSS through its high-performance, high-capacity features can be applied to the Internet, telecommunications, Internet of Things, big data processing, streaming computing and other fields.

To sum up, the port switch service is a message routing service integrating distributed coordination functions such as fault detection, service electing, service discovery, and distributed lock. By sacrificing the reliability under the extreme condition, the port switch service disclosed by the present invention realizes very high performance, capacity and concurrency capability in the premise of ensuring strong consistency, high availability and scalability (horizontal scaling).

What is claimed is:

1. A port switch service (PSS) system, comprising a server cluster and a client cluster, wherein the server cluster elects a master node in a current cluster through a quorum algorithm and is guaranteed to be unique within a specified period in a lease form; and the server cluster employs a mode of one master node plus a plurality of slave nodes, or a mode of one master node plus a plurality of slave nodes plus a plurality of arbiter nodes, and all data are stored in a memory (RAM) of the master node only (full-in-memory), thereby ensuring all data are stored in a single node; the client cluster contains various client nodes needing to use the PSS system, and each client node can establish connection with the master node as needed; after connected to the master node, the client node can register any number of ports thereon; after the client node goes offline, the corresponding registered ports to the client node are released; after the master node is offline, the corresponding registered ports thereto become invalid; the un-registered (invalid) ports can be re-registered by the client nodes.

2. The port switch service (PSS) system according to claim 1, wherein each of the client nodes maintains at least one Keep-Alive connection with the port switch service system, and any number of ports can be registered for each Keep-Alive connection; each of the client nodes needs to maintain a heartbeat signal with the port switch service system; each of the client nodes is identified in the server cluster through a unique node ID.

3. The port switch service (PSS) system according to claim 1, wherein the name of the port is described using a UTF-8 character string and must be globally unique; registering a port will fail if the port is already registered by another client node; and the port contains a message caching queue and a port release notification list.

4. The port switch service (PSS) system according to claim 1, wherein the PSS system offers the following application programming interface (API) primitives: Waiting for Message (WaitMsg), Relet, Port Registration (RegPort), Port Un-registration (UnRegPort), Message Sending (SendMsg), Port Query (QueryPort), Node Query (QueryNode) and Clear; the message registration primitive of the Port Registration permits that one communication request contains multiple port registration commands simultaneously; the message un-registration primitive of the Port Un-registration permits that one communication request contains multiple port un-registration commands simultaneously; and the message sending primitive permits that one communication request contains multiple messages simultaneously (batch message sending).

5. The port switch service (PSS) system according to claim 4, wherein the connection of the client cluster and the port switch service system includes message receiving connections and message sending connections; the message receiving connection (1:1) uses the WaitMsg method for the node registration and message pushing, keeps occupying all ports belong to current node using Relet, and uses the Clear primitive to clean up before normal disconnection; each node within the cluster should keep and only keep a single message receiving connection, which is a Keep-Alive connection; the connection active is always kept and Relet is completed in a timely manner, because re-establishing a receiving connection will require service electing again (port registration); with respect to the message sending connection (1:N): all connections that are not upgraded using WaitMsg API are deemed as sending connections, uses primitives like RegPort, UnRegPort, SendMsg and QueryPort for non-pushing requests, without the need for using Relet to keep heartbeat, and does not need to use the Clear command to clean up; and each node within the cluster maintains a message sending connection pool, so that worker threads can stay in communication with the port switch service system.

6. The port switch service (PSS) system according to claim 1, wherein the server cluster can be segmented into sub server clusters by name spaces, and the sub server clusters achieve horizontal scaling through a tree cascade structure; and each of the client nodes is registered on ports under a local name space and a superior name space of the corresponding client node.

* * * * *